(12) United States Patent
Myoung

(10) Patent No.: US 11,689,665 B2
(45) Date of Patent: Jun. 27, 2023

(54) MEDIA PROVIDING SERVER, AND METHOD AND COMPUTER PROGRAM FOR PROVIDING ORDER PROCEDURE CONTENT OF DIFFERENT ORDERING METHODS

(71) Applicant: SK STOA CO., LTD., Seoul (KR)

(72) Inventor: Dae Ho Myoung, Seoul (KR)

(73) Assignee: SK STOA CO., LTD., Seoul (KR)

( * ) Notice: Subject to any disclaimer, the term of this patent is extended or adjusted under 35 U.S.C. 154(b) by 0 days.

(21) Appl. No.: 17/517,132

(22) Filed: Nov. 2, 2021

(65) Prior Publication Data
US 2022/0150359 A1  May 12, 2022

(30) Foreign Application Priority Data
Nov. 10, 2020 (KR) .......................... 10-2020-0149602

(51) Int. Cl.
*H04N 21/478* (2011.01)
*H04M 3/523* (2006.01)
*H04N 21/488* (2011.01)
*H04M 3/428* (2006.01)

(52) U.S. Cl.
CPC ....... *H04M 3/5238* (2013.01); *H04M 3/4288* (2013.01); *H04N 21/47815* (2013.01); *H04N 21/4882* (2013.01); *H04M 2201/50* (2013.01)

(58) Field of Classification Search
None
See application file for complete search history.

(56) References Cited

U.S. PATENT DOCUMENTS

| | | | |
|---|---|---|---|
| 9,398,154 B2* | 7/2016 | Williams | H04M 3/5158 |
| 2005/0034161 A1* | 2/2005 | Brown | G06Q 30/06 |
| | | | 348/E7.071 |
| 2008/0066127 A1* | 3/2008 | Schechinger | H04N 21/4722 |
| | | | 348/E7.071 |
| 2010/0235874 A1* | 9/2010 | Johnson | H04N 21/25891 |
| | | | 705/26.1 |
| 2015/0287087 A1* | 10/2015 | Williams | H04N 21/84 |
| | | | 705/14.4 |

FOREIGN PATENT DOCUMENTS

| | | |
|---|---|---|
| KR | 1020200092272 A | 8/2020 |
| KR | 1020200112747 A | 10/2020 |

OTHER PUBLICATIONS

Office Action issued in corresponding KR Application No. 10-2020-0149602, dated Jul. 26, 2022, and an English translation, 11 pages.

\* cited by examiner

*Primary Examiner* — Nafiz E Hoque
(74) *Attorney, Agent, or Firm* — Burris Law, PLLC

(57) ABSTRACT

A media providing server and a method and computer program for providing call waiting content with respect to ARS order calls for a broadcast product provide call waiting content with respect to ARS order calls for the broadcast product and provide order content to enable a product to be ordered according to one of order methods except for an ARS order method.

14 Claims, 11 Drawing Sheets

FIG. 11

| | OD2-TA1 |
|---|---|
| | EASY ORDER |
| | [XX FOOD] YYY VITAMIN 11 MTH SET (ON AIR) |
| | QUANTITY / OPTION ▽ |
| | FOR CONVENIENCE OF REGISTERING SHIPPING ADDRESS, PLEASE PLACE FIRST ORDER ON MOBILE PHONE. THEN, YOU CAN PLACE NEXT ORDERS ON TV BY ENTERING PASSWORDS |
| | ENTER CELL PHONE NUMBER |
| | ENTER DATE OF BIRTH (8 DIGITS) |
| | CONSENT TO COLLECT AND USE PERSONAL DATA / FULL TEXT |
| | OK |

| OD2-TA2 | |
|---|---|
| TOTAL ORDER AMOUNT | 169,000 |
| PRODUCT DISCOUNT | −1,000 |
| LUMP SUM DISCOUNT | −10,000 |
| SHIPPING COST | 0 |
| TOTAL PAYMENT AMOUNT | 158,000 |

MEDIA PROVIDING SERVER, AND METHOD AND COMPUTER PROGRAM FOR PROVIDING ORDER PROCEDURE CONTENT OF DIFFERENT ORDERING METHODS

CROSS-REFERENCE TO RELATED APPLICATION

This application is based on and claims priority under 35 U.S.C. § 119 to Korean Patent Application No. 10-2020-0149602, filed on Nov. 10, 2020, in the Korean Intellectual Property Office, the disclosure of which is incorporated by reference herein in its entirety.

BACKGROUND

1. Field

The present disclosure relates to a media providing server, and a method and program for providing content for guiding a procedure of an alternate or different order method to assist users, subscribers, customers, etc. waiting after making order calls for commerce content.

2. Description of the Related Art

With the recent developments in television (TV) technology and digital technology, diverse information is delivered to viewers through TVs. For example, TV home shopping, which provides shopping information through TVs, provides a variety of information according to technological changes. As digital-based digital TV technology has become commercialized, it has become possible to provide various content through a network such as the Internet connected in each home, and an Internet Protocol Television (IPTV) service is a representative example.

In an IPTV service, various services may be provided to an IPTV service subscriber through a set-top box installed in a designated place such as a home, and among the services provided, shopping broadcast services (or commerce broadcast) may also be provided through a commerce channel.

In the case of commerce business operators producing shopping broadcast services, commerce business operators contract to schedule a commerce channel (that is, a shopping broadcast service) in a channel assigned according to payment amount.

When an IPTV service subscriber selects the assigned channel on a set-top box, the set-top box outputs the commerce channel that is regularly scheduled in the channel through a TV, and thus, the IPTV service subscriber may watch the commerce channel and use shopping broadcast services. Convenience such as the transmission of a variety of shopping information according to a user's request and the confirmation of shopping information and order placement may improve.

SUMMARY

One or more embodiments provide content regarding the number of people waiting after making order calls when there are people waiting after making calls for commerce content, and provide order content to enable a product to be ordered according to order methods except for an ARS order method.

Additional aspects will be set forth in part in the description which follows and, in part, will be apparent from the description, or may be learned by practice of the presented embodiments of the disclosure.

According to one or more embodiments of the disclosure, there is provided a method of providing content regarding the number of people waiting after making ARS order calls for a broadcast product, the method including receiving a connection signal from a set-top box and transmitting, to the set-top box, image identification information of commerce content in response to the connection signal, wherein the receiving and the transmitting are performed by a media providing server; generating product state data regarding the image identification information and transmitting the product state data to the set-top box, wherein the generating and the transmitting are performed by the media providing server; generating content regarding the number of people waiting for a call (hereinafter, referred to as a "call waiting content") and transmitting, to the set-top box, output data about the call waiting content, wherein the generating and the transmitting are performed by the media providing server; requesting, to an ARS server, data regarding inbound calls to customer service representatives, based on current time information, and receiving, from the ARS server, the data regarding the inbound calls to the customer service representatives that includes first call waiting list information, wherein the requesting and the receiving are performed by the media providing server; determining whether the first call waiting list information is greater than a reference number of waiting people that is set in advance; when the first call waiting list information is greater than the reference number of waiting people, transmitting, to the set-top box, the data regarding the inbound calls to the customer service representatives that includes the first call waiting list information through the ARS server, wherein the transmitting is performed by the media providing server; and displaying, by the set-top box, the call waiting content, corresponding to the first call waiting list information.

In at least one variant, the call waiting content may include at least one of first output content for displaying the first call waiting list information and the second output content for displaying at least one order method.

In another variant, the method may further include displaying, by the set-top box, order content included in the call waiting content.

In another variant, the method may further include, when a selection input for the order content is received, displaying, by the set-top box, order procedure content corresponding to a code value of the selection input.

In another variant, the call waiting content may include order content of at least one order method provided by the media providing server from among a plurality of order methods except for an ARS call order.

In another variant, the call waiting content may include order content of an order method corresponding to at least one of an on-demand ARS order method and a remote-control order method.

In another variant, the method may further include, when the first call waiting list information is not greater than the reference number of waiting people, outputting, by the set-top box, output data regarding the product state data through an output device.

In another variant, the method may further include: after the displaying of the call waiting content, receiving, from the ARS server, data regarding inbound calls to customer service representatives that includes second call waiting list information, wherein the receiving is performed by the media providing server; and when the second call waiting list information is less than or equal to the reference number of waiting people, displaying, by the set-top box, product state data regarding the image identification information.

In another variant, the data regarding the inbound calls to the customer service representatives may be received through a data server from the ARS server.

In another variant, the product state data regarding the image identification information may be received from a data server and generated by transmitting, to the data server, a product state data request signal including product code corresponding to the image identification information and by using a response signal of the product state data request signal.

According to one or more embodiments of the disclosure, there is provided a media providing server including a communication unit and a processor, wherein the processor is configured to receive a connection signal from a set-top box and transmit, to the set-top box, image identification information of commerce content in response to the connection signal, generate product state data regarding the image identification information and transmit the product state data to the set-top box, generate call waiting content and transmit, to the set-top box, output data about the call waiting content, request, to an ARS server, data regarding inbound calls to customer service representatives based on current time information and receive, from the ARS server, the data regarding the inbound calls to the customer service representatives that includes first call waiting list information, and determine whether the first call waiting list information is greater than a reference number of waiting people that is set in advance, and when the first call waiting list information is greater than the reference number of waiting people, transmit, to the set-top box, the data regarding the inbound calls to the customer service representatives that includes the first call waiting list information through the ARS server and control the set-top box to display output data about the call waiting content.

According to one or more embodiments of the disclosure, there is provided a computer program stored in a computer-readable recording medium to execute any one method by using a computer.

According to one or more embodiments of the present disclosure, a method of generating broadcast content responsive to a current usage load of a media providing system is provided. The method includes steps of (i) receiving, with a media providing server, a connection signal from a set-top box, (ii) transmitting with the media providing server, to the set-top box, image identification information of commerce content in response to the connection signal, (iii) generating product state data regarding the image identification information and transmitting the product state data to the set-top box, wherein the generating and the transmitting are performed by the media providing server, (iv) generating call waiting content and transmitting, to the set-top box, output data about the call waiting content, wherein the generating and the transmitting are performed by the media providing server, (v) receiving with the media providing server, from an ARS server, data regarding a current status of inbound calls to the customer service representatives that includes first call waiting list information, (vi) determining whether the first call waiting list information is greater than a predetermined reference number of waiting calls, (vii) upon determination that the first call waiting list information is greater than the predetermined reference number of waiting calls, transmitting with the media providing server, to the set-top box, the first call waiting list information via the ARS server, and (viii) displaying, by the set-top box, the call waiting content, corresponding to the first call waiting list information.

In at least one variant, the method further includes generating the call waiting content further comprises generating first output content for displaying the first call waiting list information, second output content for displaying at least one order method, or both.

In another variant, the method further includes displaying, by the set-top box, order content included in the call waiting content.

In another variant, the method further includes, upon receiving a selection input for the order content, displaying, by the set-top box, order procedure content corresponding to a code value of the selection input.

In another variant, the step of generating the call waiting content further includes generating order content of at least one order method with the media providing server, wherein said at least one order method is different from an ARS call order method.

In another variant, the step of generating the call waiting content further includes generating first order content of an on-demand ARS order method, or generating second order content of a remote-control order method.

In another variant, the method further includes, upon determination that the first call waiting list information is not greater than the predetermined reference number of waiting calls, outputting, by the set-top box, output data regarding the product state data through an output device.

In another variant, the method further includes, after the displaying of the call waiting content, receiving, from the ARS server, second call waiting list information, and upon determination that the second call waiting list information is less than or equal to the predetermined reference number of waiting calls, displaying, by the set-top box, product state data regarding the image identification information.

In another variant, the method further includes receiving, with a data server, a product state data regarding the image identification information, transmitting, to the data server, the product state data request signal comprising a product code corresponding to the image identification information, and generating the product state data by using a response signal of the product state data request signal.

According to one or more embodiments of the present disclosure, a computer program stored in a computer-readable recording medium to execute the above-described methods by using a computer.

According to one or more embodiments of the present disclosure, a media providing server includes a communication unit and a processor. The processor is configured to (i) receive a connection signal from a set-top box and transmit, to the set-top box, image identification information of commerce content in response to the connection signal, (ii) generate product state data regarding the image identification information and transmit the product state data to the set-top box, (iii) generate call waiting content and transmit, to the set-top box, output data about the call waiting content, (iv) request, to an ARS server, data regarding a current status of inbound calls to customer service representatives based on current time information and receive, from the ARS server, first call waiting list information, and (v) determine whether the first call waiting list information is greater than a predetermined reference number of waiting calls, and upon determination that the first call waiting list information is greater than the predetermined reference number of waiting calls, transmit, to the set-top box, the first call waiting list information through the ARS server and control the set-top box to display output data about the call waiting content.

In at least one variant, the call waiting content further includes first output content for displaying the first call waiting list information, second output content for displaying at least one order method, or both.

In another variant, the set-top box is controlled to display order content included in the call waiting content.

In another variant, when a selection input for the order content is received, the set-top box is controlled to display order procedure content corresponding to a code value of the selection input.

In another variant, the call waiting content comprises order content of at least one order method which is different from an ARS call order method.

In another variant, the call waiting content further comprises first order content of an on-demand ARS order method and second order content of a remote-control order method.

In another variant, upon determination that the first call waiting list information is not greater than the predetermined reference number of waiting calls, the set-top box is controlled to display output data regarding the product state data through an output device.

In another variant, the process is configured to receive, from the ARS server, second call waiting list information after the call waiting content is displayed, and transmit the second call waiting list information to the set-top box when a determination as to whether the second call waiting list information is less than or equal to the predetermined reference number of waiting calls is made, and the set-top box is configured to display the product state data regarding the image identification information, corresponding to the second call waiting list information.

In another variant, the processor is further configured to receive the data regarding the inbound calls to the customer service representatives from the ARS server via a data server.

In another variant, the processor is further configured to receive the product state data regarding the image identification information from the data server, and transmit, to the data server, a product state data request signal comprising product code corresponding to the image identification information, and generate the product state data by using a response signal of the product state data request signal.

In addition, other methods, and systems for implementing the disclosure, and computer-readable recording media having recoded thereon computer programs to execute the methods are further provided.

Other aspects, features, and advantages other than those described above will become apparent from the following detailed description, claims and drawings for carrying out the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 11 shows an example of an order procedure regarding an order input of 'a remote-control order.'

DETAILED DESCRIPTION

Figure 1:
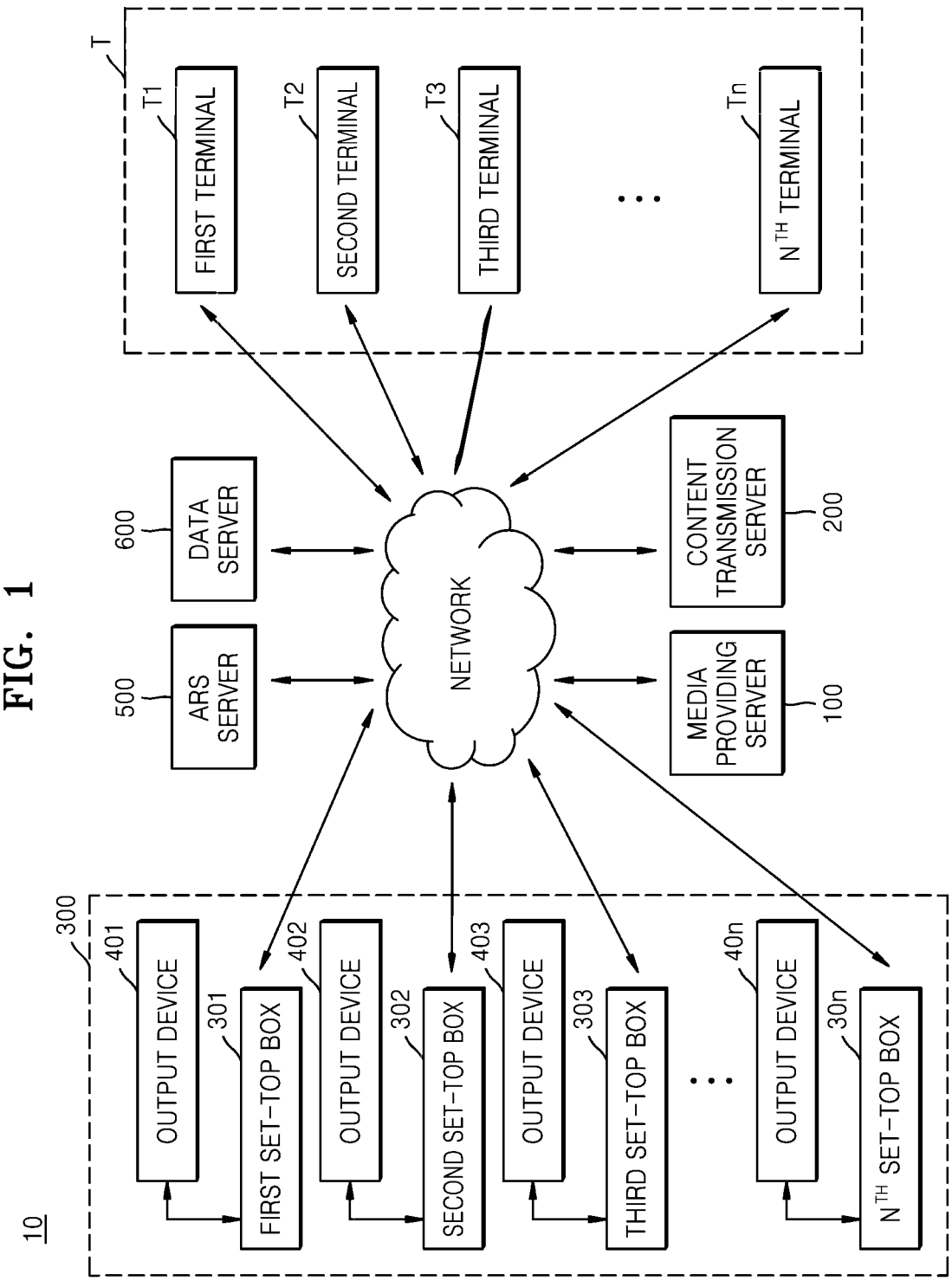
FIG. 1 illustrates a network environment of a media providing system that transmits broadcast images through a media providing server, according to embodiments.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

The configuration and operation of the present disclosure will now be described more fully with reference to the accompanying drawings, in which embodiments of the present disclosure are shown.

As the disclosure allows for various changes and numerous embodiments, particular embodiments will be illustrated in the drawings and described in detail in the written description. The attached drawings for illustrating embodiments of the present disclosure are referred to in order to gain a sufficient understanding of the present disclosure, the merits thereof, and the objectives accomplished by the implementation of the present disclosure. The present disclosure may, however, be embodied in many different forms and should not be construed as being limited to the embodiments set forth herein.

Hereinafter, the present disclosure will be described in detail by explaining embodiments of the disclosure with reference to the attached drawings. Like reference numerals in the drawings denote like elements, and thus their description will be omitted.

While such terms as "first," "second," etc., may be used to describe various components, such components must not be limited to the above terms. The above terms are used only to distinguish one component from another.

As used herein, the singular forms "a," "an," and "the" are intended to include the plural forms as well, unless the context clearly indicates otherwise It will be further understood that the terms "comprises" and/or "comprising" used herein specify the presence of stated features or components, but do not preclude the presence or addition of one or more other features or components.

Sizes of components in the drawings may be exaggerated for convenience of explanation. In other words, since sizes and thicknesses of components in the drawings are arbitrarily illustrated for convenience of explanation, the following embodiments are not limited thereto.

When a certain embodiment may be implemented differently, a specific process order may be performed differently from the described order. For example, two consecutively described processes may be performed substantially at the same time or performed in an order opposite to the described order.

In general, a set-top box is a hardware device required for households to watch a satellite broadcast or a cable broadcast. Data such as a satellite broadcast, a cable broadcast, or an Internet broadcast may be processed through compression or modulation and transmitted to a set-top box. The set-top box may perform processing such as demodulation and decompression on the received data to allow the processed data to be implemented on a terminal such as a television (TV).

FIG. 1 illustrates a network environment of a media providing system 10 that transmits broadcast images through a media providing server 100, according to one or more embodiments of the present disclosure.

The media providing system 10 may include the media providing server 100, a content transmission server 200, a first set-top box 301, a second set-top box 302, a third set-top box 303, . . . , and an $n^{th}$ set-top box 30n, an ARS server 500, a data server 600, a first terminal T1, a second terminal T2, a third terminal T3, . . . , and an $n^{th}$ terminal Tn. The media providing system 10 may further include output devices 401, 402, 403, . . . , and 40n (hereinafter, referred to as output devices 400) respectively connected to the first set-top box 301, the second set-top box 302, the third set-top box 303, . . . , and the $n^{th}$ set-top box 30n. At least one of the first set-top box 301, the second set-top box 302, the third set-top box 303, . . . , and the $n^{th}$ set-top box 30n may be referred to as a set-top box 300. At least one of the first terminal T1, the second terminal T2, the third terminal T3, . . . , and the $n^{th}$ terminal Tn may be referred to as a terminal T.

In the media providing system 10, the media providing server 100, the content transmission server 200, the set-top box 300, the ARS server 500, the data server 600, and the terminal T may communicate with each other through a network. A communication method of the network of the present disclosure includes wired or wireless communication, but it is not limited thereto. A network according to some embodiments may use short-range wireless communication. In the media providing system 10, the set-top box 300 may be connected to the output devices 400 through the network or electric wires. Also, the set-top box 300 and the output devices 400 may be realized as one hardware. The media providing system 10 may further include a remote control device (e.g., a remote control) for communicating with the set-top box 300 and/or the output devices 400. The set-top box 300 or the output devices 400 may communicate with each other through a remote control and a Local Area Network (LAN).

The set-top box 300 may be installed in a designated area in a house, etc. to provide broadcast service and may provide broadcast service such as shopping broadcast service through a commerce channel.

The set-top box 300 may communicate with the media providing server 100 and the content transmission server 200 through the network. The set-top box 300 may transmit, to the output device 400, data received from the media providing server 100 and the content transmission server 200. The output devices 400 may include a TV, a smart TV, etc., and all types of electronic devices, for example, a smartphone and a Portable Multimedia Player (PMP), which include displays.

The set-top box 300 may transmit, to the media providing server 100, a user input from a separate input device or the output device 400.

The media providing system 10 may generate output data for broadcast through the media providing server 100, and the output data for broadcast may be transmitted from the media providing server 100 to the set-top box 300. The media providing server 100 may transmit the output data for broadcast to the set-top box 300 by using cloud service.

The media providing server 100 may transmit, to the set-top box 300, content information corresponding to the output data. The media providing server 100 may execute an application stored in a cloud server and may stream the application on the output device 400 of each user to display the same. In this case, the output device 400 may be controlled using program(s) installed in the set-top box 300 and may output a broadcast image or a product image according to the control of the set-top box 300. The set-top box 300 may be realized using instructions from the media providing server 100.

The media providing server 100 may generate the output data for broadcast based on the data received from the data server 600. The data server 600 may store and manage various pieces of data related to a broadcast image, a shop image, pop-up content, order content, and content regarding the number of people waiting for a call.

The media providing server 100 may generate a user interface by using the data stored in the data server 600. The media providing server 100 may receive, from the data server 600, product information, client information, order information, schedule information, and the like. The media providing server 100 may receive a request signal corresponding to a user input from the set-top box 300 and may generate response output data of the request signal by using the data received from the data server 600.

The media providing server 100 may transmit commerce content to the set-top box 300, and an order call for the commerce content may be generated from the set-top box 300 or a terminal of a user. An ARS order call generated according to the above process is processed by the ARS server 500. The media providing server 100 may transmit, to the set-top box 300, information regarding the ARS order call for the commerce content.

While providing the commerce content, the media providing server 100 may receive, from the ARS server 500 or the data server 600, data regarding inbound calls to customer service representatives that includes call waiting list information regarding the commerce content. In some forms, the media providing server 100 and the ARS server 500 may be included in one device, and, in other forms, as illustrated in FIG. 1, the media providing server 100 and the ARS server 500 may be included in separate devices, respectively.

The media providing server 100 may be configured to provide content regarding the call waiting list information while providing product state data of a product being on sale in the commerce content. The content regarding a number of users, subscribers, customers, etc. waiting for a call (hereinafter, referred to as a "call waiting content") may be displayed when the received data regarding the inbound calls to the customer service representatives satisfies preset conditions. The call waiting content may be displayed together with the commerce content through the set-top box 300.

The set-top box 300 may receive the product state data of the product being on sale in the commerce content and call waiting content and may display, on the output device 400, existing product state data or the call waiting content, corresponding to the data regarding the inbound calls to the customer service representatives that is received in real-time while the commerce content is displayed. When the call waiting list information is greater than the preset reference number of waiting people, the set-top box 300 may display the call waiting content, and when it is not, the set-top box 300 may display the existing product state data.

The ARS server 500 may connect order calls from user terminals having call functions to terminals of the customer service representatives so that the users may communicate with the customer service representatives. The ARS server 500 may transmit order information, which is input through the terminals of the customer service representatives, to the data server 600 and manage the order information. The order information may include contact information of a customer (a name, a phone number, an address, ID information, etc.), order information (an order date, a payment method, shipping address information, etc.), and the like.

The ARS server 500 may manage a state of the terminal of the customer service representative as one of 'connected' and 'stop' and may connect generated order calls to the terminal of the customer service representative. The ARS server 500 may manage the number of order calls (incoming calls) that are already made and wait to be connected to the customer service representatives because the states of the terminals of the customer service representatives are all 'connected.' The number of order calls, which are already made and wait to be connected to the customer service representatives, may be managed as the call waiting list information and transmitted to the media providing server 100 or the data server 600 in determined time intervals or according to every request.

The media providing server 100 may control the set-top box 300 through the program installed in the set-top box 300. The media providing server 100 may perform a function of reading information of the set-top box 300. The media providing server 100 may receive a platform code, an STP ID, connection information, and the like of the set-top box 300. The media providing server 100 may generate output data of the set-top box 300 based on information regarding the set-top box 300. The media providing server 100 may re-generate the output data for broadcast according to a user input obtained through the set-top box 300 and may transmit the output data for broadcast to the set-top box 300.

The media providing server 100 may enable capture information including diverse content such as operation, instead of information including the same content through a cloud solution, to be displayed on a screen of the output device 400 by using the set-top box 300. The media providing server 100 may be realized using a cloud server and may control a change of at least one first cloud server and a second cloud server. The media providing server 100 may implement the screen in the output device 400 by executing an application corresponding to a selection channel through the first cloud server and thus may accept a predetermined number of terminals.

The set-top box 300 may receive output data in communication with the media providing server 100 and may analyze and read (encode, etc.) the received output data to output the same through the output device 400 such as a TV.

The set-top box 300 may output the output data for broadcast, which is received from the media providing server 100, on the output device 400. The set-top box 300 may obtain a user input via an included input device and may transmit a request signal corresponding to the user input to the media providing server 100.

The content transmission server 200 may perform a function of transmitting, to the set-top boxes 300, broadcast images of at least one broadcast station or a broadcast channel. The content transmission server 200 may be configured to stream the content received from a content providing server.

The data server 600 may store and manage the information used to generate the output data for broadcast. The data server 600 may be a computing server in which a server program such as Apache Tomcat® or Oracle is installed and may be configured to process a server function. As described above, the data server 600 may store product information, manufacturing information, and/or review information of content. In addition, the data server 600 may store image identification information, pop-up data, and the like and may provide relevant information to the media providing server 100 in response to a request from the media providing server 100.

The user terminal T according to an embodiment may denote a terminal that an ordering person or a customer service representative has. The user terminal T of the customer service representative may receive a call reception signal from the ARS server 500. When a response to the call reception signal is input, the user terminal T1 of the customer service representative may be connected to a terminal T2 of the ordering person that is assigned by the ARS server 500.

The user terminal T may be an electronic device corresponding to information that is input from a user of the set-top box 300 and the output device 400. The user terminal T may be realized as a portable device such as a smartphone, but it is not limited thereto. The user terminal T may be realized as various types of devices, for example, a personal computer (PC), a tablet PC, a PMP, a Personal Digital Assistant (PDA), and the like, which has a display function.

The media providing system 10 according to an embodiment may further include a content providing server (not shown in FIG. 1). The content providing server may register (e.g., acquire and store) content such as a commerce video to be provided. Also, the content providing server may receive, from the data server 400, meta-information of the content such as a video and may match meta-information for each content. To this end, the content providing server may be connected to the data server 400 and may exchange various pieces of information through communication.

The content providing server may convert content such as the registered video according to a platform or format of each broadcast station and may transmit the converted content to the content transmission server 200. One or more embodiments of the present disclosure are not limited thereto. The content providing server may store and transmit the content to the content transmission server 200, and the content transmission server 200 may convert the content according to a platform or format of a broadcasting station and may store the converted content. The above description is also applied to embodiments described below and modified embodiments.

The content providing server may obtain the meta-information of the content from the data server 400. The meta-information may include the product information, the manufacturing information, and/or the review information related to the content. In some cases, the content providing server may directly receive the meta-information from a content provider and may store the same.

The content providing server may transmit, to the content transmission server 200, data of content such as a video or data of the converted content through a Content Delivery Network (CDN). Also, the content providing server may receive image identification information of each video from the content transmission server 200. The image identification information may be, for example, playback URL information stored in the content transmission server 200.

Figure 2:
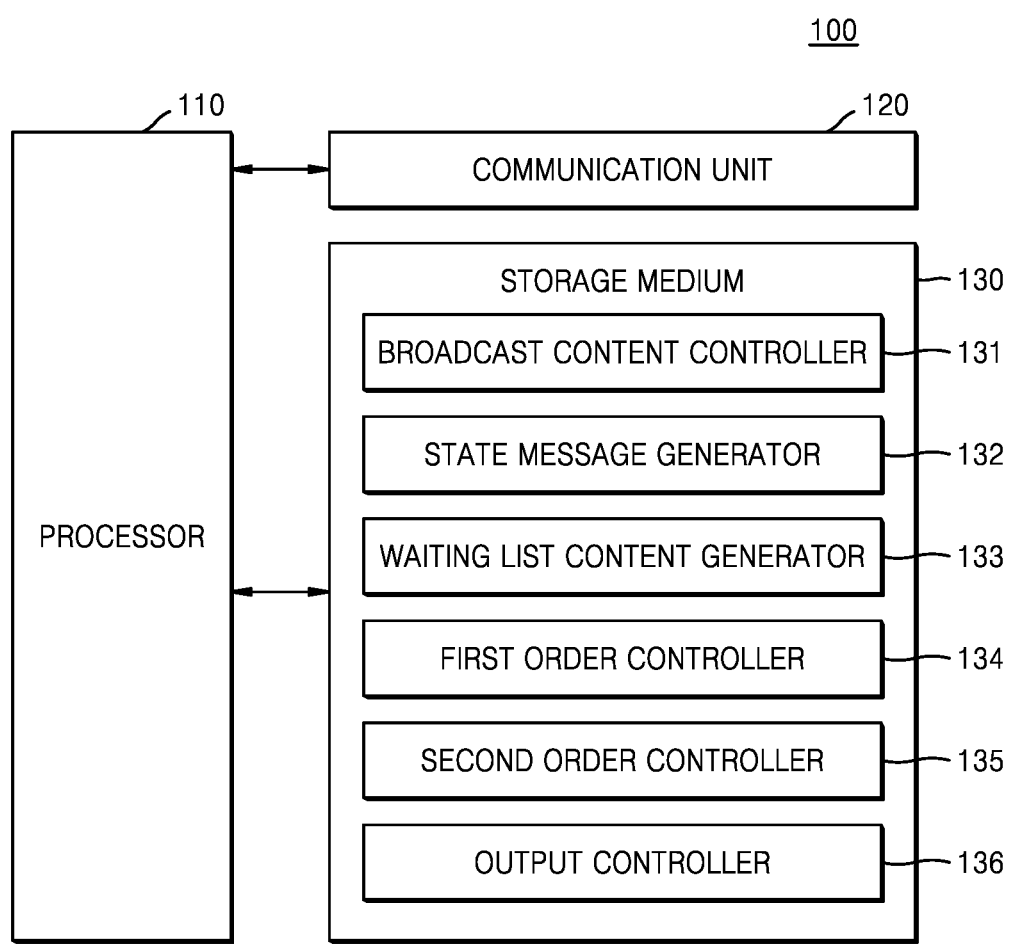
FIG. 2 is a block diagram of a media providing server according to embodiments.

FIG. 2 is a block diagram illustrating one exemplary structure of the media providing server 100 according to embodiments.

A processor 110 controls the media providing server 100 overall. In detail, the processor 110 controls all operations of the media providing server 100 by using various programs stored in a storage medium 130 of the media providing server 100. For example, the processor 110 may include a Central Processing Unit (CPU), Random Access Memory (RAM), Read Only Memory (ROM), and a system bus. Here, the ROM is a component in which a set of instructions for booting a system are stored, and the CPU copies an operating system (O/S), which is stored in the media providing server 100, to the RAM according to the instructions stored in the ROM and boots the system by executing the O/S. When the booting is completed, the CPU may copy stored applications to the RAM and execute the same to perform various operations. It has been described that the media providing server 100 includes only one CPU, but the media providing server 100 may include a plurality of CPUs (or a digital signal processor (DSP), a System on Chip (SoC), etc.).

In some forms, the processor 110 may be realized as a DSP for processing a digital signal, a microprocessor, or a time controller (TCON). However, the processor 110 is not limited thereto. The processor 110 may include one or more of a CPU, a Micro Controller Unit (MCU), a Micro Processing Unit (MPU), a controller, an Application Processor (AP), a Communication Processor (CP), and an ARM processor and may be defined by the terms. Also, the processor 110 may be realized as an SoC or Large Scale Integration (LSI) in which a processing algorithm is installed or may be realized as a Field Programmable Gate Array (FPGA).

A communication unit 120 is a component for exchanging data with devices such as the content transmission server 200, the set-top box 300, the ARS server 500, the data server 600, and the user terminal T. The communication unit 120 may include a Bluetooth communication unit, a Bluetooth Low Energy (BLE) communication unit, a Near Field communication unit, a WLAN (Wi-Fi) communication unit, a Zigbee communication unit, an Infrared Data Association (IrDA) communication unit, a Wi-Fi Direct (WFD) communication unit, an ultra-wideband (UWB) communication unit, a short distance communication unit such as an Ant+ communication unit, a mobile communication network, or a wired Ethernet network.

The media providing server 100 may further include the storage medium 130 in which various pieces of data for all operations, for example, programs for processing or controlling the processor 110, are stored. In detail, the storage medium 130 may store application programs or applications executed by the media providing server 100, and data or instructions for the operation of the media providing server 100. At least some of the application programs may be downloaded from an external server through wireless communication. Also, at least some of the application programs may exist on the media providing server 100 in the first place for basic functions of the media providing server 100. The application program may be stored in the storage medium 130 and executed for the operation (or functions) of the media providing server 100 by the processor 110.

The storage medium 130 may include a broadcast content controller 131, a state message generator 132, a waiting list content generator 133, a first order controller 134, a second order controller 135, and an output controller 136. The broadcast content controller 131, the state message generator 132, the waiting list content generator 133, the first order controller 134, the second order controller 135, or the output controller 136 may be implemented as a program code. The broadcast content controller 131, the state message generator 132, the waiting list content generator 133, the first order controller 134, the second order controller 135, or the output controller 136 may be read by the processor 110 and may be executed by the processor 110.

The broadcast content controller 131 may generate content corresponding to a channel displayed on the output device 400 according to the control of the user and may transmit the content to the set-top box 300 to display the same. For example, when the user sends a selection input of selecting a channel by using a remote control while watching TV, the broadcast content controller 131, upon execution by the processor 110, may identify the selection input and enable a content image related to the channel corresponding to the selection input to be displayed on an output device of the user. Alternatively, when a user input is made in the channel, the broadcast content controller 131 may enable a content image corresponding to the user input in the channel to be displayed on the output device of the user.

The processor 110 may execute an application related to a moving image when an image set in the channel is displayed through the broadcast content controller 131. The broadcast content controller 131 may control information such as the displayed images or moving images before the channel is changed. The broadcast content controller 131 may control a screen of the output device 400 by controlling an application including broadcast images, commerce content, and the like through signal connection with the set-top box 300 connected to the output device 400.

The application executed in the output device 400 through the broadcast content controller 131 may include various pieces of interface information, output information, and the like. For example, a navigation menu that allows a movement to other commerce content, a list screen of commerce content retrieved in response to a user input, an order procedure content for commerce content, and the like may be displayed.

Also, the application executed in the set-top box 300 through the broadcast content controller 131 may be controlled to display at least one piece of content information. The broadcast content controller 131 may control a region of the entire screen where the content is displayed. The broadcast content controller 131 may control where the content is displayed in a frame area on the screen which is indicated by the application.

The set-top box 300 may receive, from the broadcast content controller 131, a signal regarding the content implementation and may obtain content corresponding to the signal from the content transmission server 200, thus controlling the content to be displayed on the screen of the output device 400.

The state message generator 132 may receive an access signal from the set-top box 300, determine image identification information of commerce content corresponding to the access signal, and generate product state data regarding the image identification information. The product state data may be information corresponding to the image identification information and information regarding reviews of a product on sale, detail description information, rating information, and information regarding a purchase status. The information regarding the purchase status may include total number of orders during the broadcast, total number of accumulated orders, total number of pre-orders, sales information, and the like. The product state data may be output through a WD region of FIG. 6. The state message generator 132 may transmit the output data regarding the product state data to the set-top box 300. The product state data regarding the image identification information may be received from the data server 600, and generated by transmitting, to the data server, a product state data request signal including a product code corresponding to the image identification information and by using a response signal of the product state data request signal.

The waiting list content generator 133 may generate a call waiting content, where the call waiting content is displayed when a number of calls waiting is greater than a predetermined reference number of calls. The waiting list content generator 133 may transmit, to the set-top box 300, output data about the call waiting content.

The call waiting content may be displayed alternatively to the product state content, but it is not limited thereto. The call waiting content and the product state content may be simultaneously displayed.

The call waiting content may be configured to selectively display a message for guiding another order method in addition to a guide message regarding waiting people. For example, messages such as 'there are a lot of calls waiting,' easy automatic order, ' and 'remote-control order' may be alternately displayed. The call waiting content may include content regarding orders by using other order methods except for an ARS call order.

The waiting list content generator 133 may receive, from the ARS server 500, data regarding inbound calls to customer service representatives based on current time information, and when call waiting list information included in the data regarding the inbound calls to the customer service representatives is greater than a predetermined reference number of waiting calls, the waiting list content generator 133 may transmit, to the set-top box 300, the data regarding the inbound calls to the customer service representatives.

The data regarding the inbound calls to the customer service representatives may be obtained corresponding to the current time information or the image identification information. In more detail, the inbound calls to the customer service representatives with regard to the image identification information may be obtained based on a product code corresponding to the image identification information. The product code corresponding to the image identification information may be received according to a request sent to the data server 600. The product code corresponding to the image identification information may indicate a code of at least one product on sale in image content of the image identification information.

The data regarding the inbound calls to the customer service representatives may include total number of incoming order calls that are currently being handled, total number of order calls that have been completed, total number of users, subscribers, customers, etc. making order calls and waiting to be connected, based on the current time information. In another embodiment, the data regarding the inbound calls to the customer service representatives may be received from the data server 600 through the ARS server 500.

When call waiting list information included in the data regarding the inbound calls to the customer service representatives is greater than the reference number of waiting people, the set-top box 300 may display the call waiting count on the output device.

The waiting list content generator 133 may generate order content including the call waiting count and may transmit the order content to the set-top box 300. In this case, the order content corresponding to the call waiting content may be configured to provide order procedure content corresponding to a code value of an order method that is output to the call waiting content. For example, when a 'remote-control order' is displayed using the call waiting content, and when an order selection input is received, order procedure content regarding the 'remote-control order' may be provided. When 'easy automatic order' is displayed using the call waiting content, and when an order selection input is received, order procedure content regarding the 'easy automatic order' may be provided.

When an input for selecting an 'order' is received from the set-top box 300 while a message regarding a first order method is displayed using the call waiting content, the first order controller 134 (shown in FIG. 2) may control the set-top box 300 to provide order procedure content regarding the first order method.

When an input for selecting an 'order' is received from the set-top box 300 while a message regarding a second order method is displayed using the call waiting content, the second order controller 135 may control the set-top box 300 to provide order procedure content regarding the second order method.

The first order method or the second order method may be registered in relation to the image identification information from among order methods provided by the media providing server 100. In the above description, the order methods are referred to as the first order method or the second order method, but according to the number of order methods provided, order controllers may be added.

The order procedure content regarding the 'easy automatic order' may be order procedure content corresponding to a corresponding order method and may include a screen on which phone numbers corresponding to IDs of the set-top box 300 are provided according to the 'easy automatic order.' Also, a process of selecting a phone number, to which the corresponding order method is applied, from among the phone numbers, may be performed using the order procedure content regarding the 'easy automatic order.'

The order procedure content regarding the 'remote-control order' may include order information according to an input from the remote control, a screen on which payment information is input, and a screen on which an order quantity is input.

The output controller 136 may generate pieces of output data regarding the generated pieces of content and transmit the same to the set-top box 300.

When the call waiting list information is greater than the predetermined reference number of waiting calls, the output data about the call waiting count may be displayed on the connected output device 400 according to the control of the set-top box 300, and when the call waiting list information is less than or equal to the predetermined reference number of waiting calls, output data regarding the product state data may be displayed. A process of comparing the call waiting list information with the reference number of waiting calls may be performed by the set-top box 300, and the output data about the call waiting count and the output data regarding the product state data may be displayed.

The output controller 136 may define an area, where the product state data is displayed, and may control the call waiting count to be displayed in the area. Alternatively, the call waiting count may be displayed in a separate area. The call waiting count may be configured to be displayed when the call waiting list information is greater than the reference number of waiting calls (e.g., 10, 5, or the like). When the call waiting list information decreases, the call waiting count may be displayed no longer.

In some embodiments, the waiting list content generator 133 may receive the data regarding the inbound calls to the customer service representatives in determined time intervals or in response to a request signal. The waiting list content generator 133 may generate the call waiting count in a predetermined situation. The call waiting count may include content for outputting the call waiting list information and content for outputting an order method.

Also, the call waiting count may include instructions regarding display conditions. For example, when the call waiting list information is greater than the reference number of waiting calls, an instruction for displaying the call waiting count may be included.

As described, when call waiting list information regarding ARS order calls is greater than the reference number of waiting calls, the media providing server 100 may generate a control signal to provide the call waiting list information regarding the ARS order calls and may guide other order methods than the ARS order. The set-top box 300 may receive the control signal to provide the call waiting list information and may display the call waiting count on the output device 400.

Also, while the call waiting count is output, the media providing server 100 may guide order methods other than the ARS order with regard to the selection input for the order content, and thus a loss of selecting the ARS order and waiting may be prevented.

Figure 3:
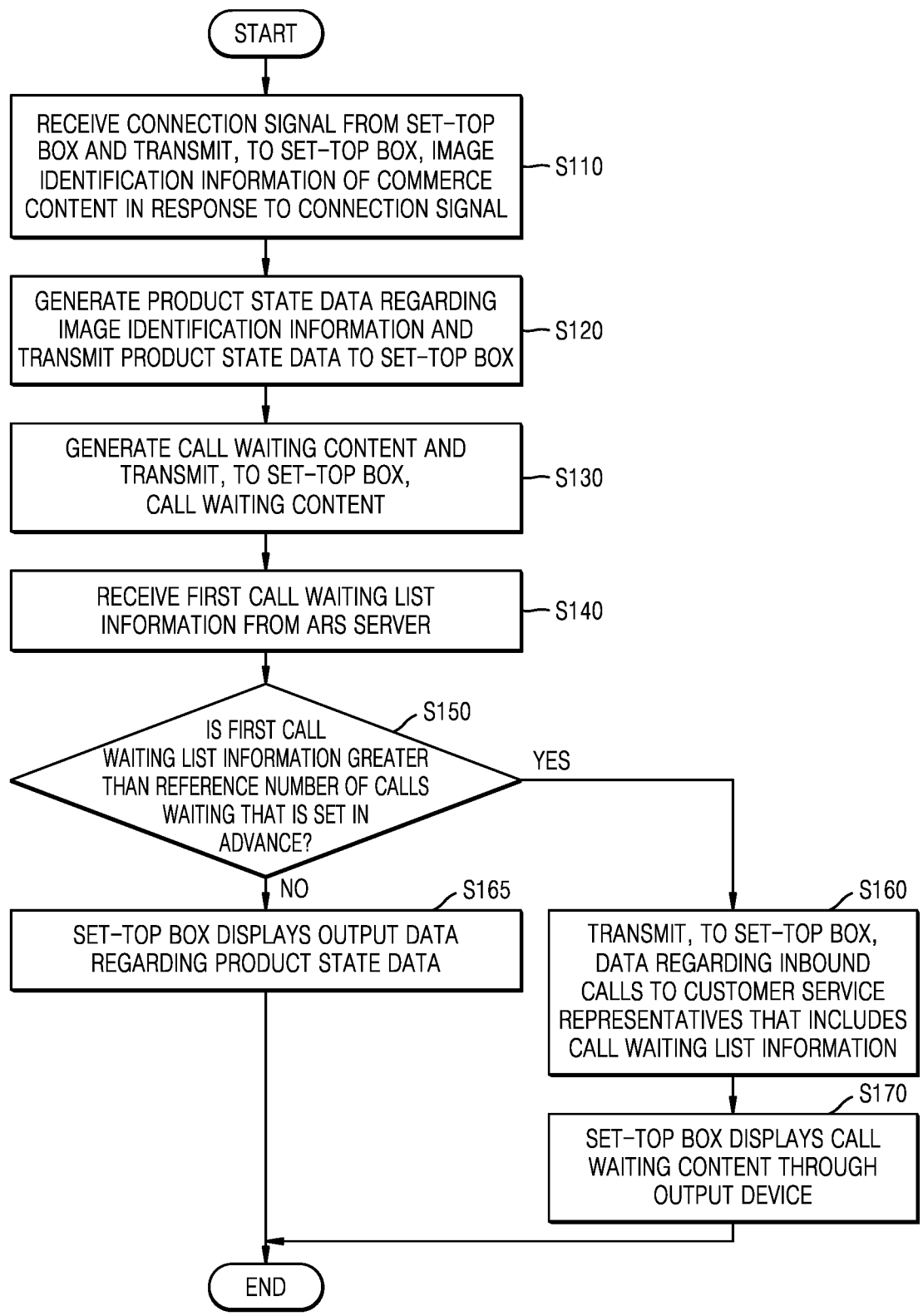
FIG. 3 is a flowchart of a method of providing a call waiting content with respect to ARS order calls for a broadcast product, according to embodiments.

FIG. 3 is a flowchart of a method of providing call waiting count making ARS order calls for a broadcast product, according to embodiments.

In operation S110, the media providing server 100 may receive a connection signal from the set-top box 300 and may transmit, to the set-top box 300, image identification information of commerce content in response to the connection signal.

In operation S120, the media providing server 100 may generate product state data regarding the image identification information and may transmit the product state data to the set-top box 300.

In operation S130, the media providing server 100 may generate a call waiting content. The call waiting count may be displayed when the number of call waiting people is greater than the predetermined reference number of waiting calls that is set in advance. The media providing server 100 may transmit, to the set-top box 300, output data about the call waiting content.

In operation S140, the media providing server 100 may receive, from the ARS server 500, data regarding inbound calls to customer service representatives, the data being related to the image identification information. The data regarding the inbound calls to the customer service representatives may include first call waiting list information.

The data regarding the inbound calls to the customer service representatives, which is related to the image identification information, may be obtained based on a product code corresponding to the image identification information. The product code corresponding to the image identification information may be received from the data server 600 according to a request. The product code corresponding to the image identification information indicates a code of at least one product that is on sale in the image content of the image identification information. The data regarding the inbound calls to the customer service representatives may include the number of ARS orders that are currently being handled, the number of ARS orders completed, the number of waiting calls for ARS orders, and the like.

In operation S150, the media providing server 100 may determine whether the first call waiting list information is greater than the predetermined reference number of waiting calls that is set in advance.

In operation S165, when the first call waiting list information is less than or equal to the reference number of waiting calls, the media providing server 100 may not transmit the data regarding the inbound calls to the customer service representatives to the set-top box 300, and the set-top box 300 may display output data regarding the product state data.

In operation S160, when the first call waiting list information is less than or equal to the reference number of waiting calls, the media providing server 100 may transmit, to the set-top box 300, the data regarding the inbound calls to the customer service representatives. In operation S170, the set-top box 300 may display the call waiting count in accordance with the first call waiting list information.

The call waiting count may be displayed alternatively to the product state content, but it is not limited thereto. The call waiting count and the product state content may be simultaneously displayed.

The call waiting count may be configured to selectively display a message for guiding another order method in addition to a guide message regarding waiting people. For example, messages such as 'there are a lot of calls waiting,' easy automatic order, ' and 'remote-control order' may be alternately displayed.

Figure 4:
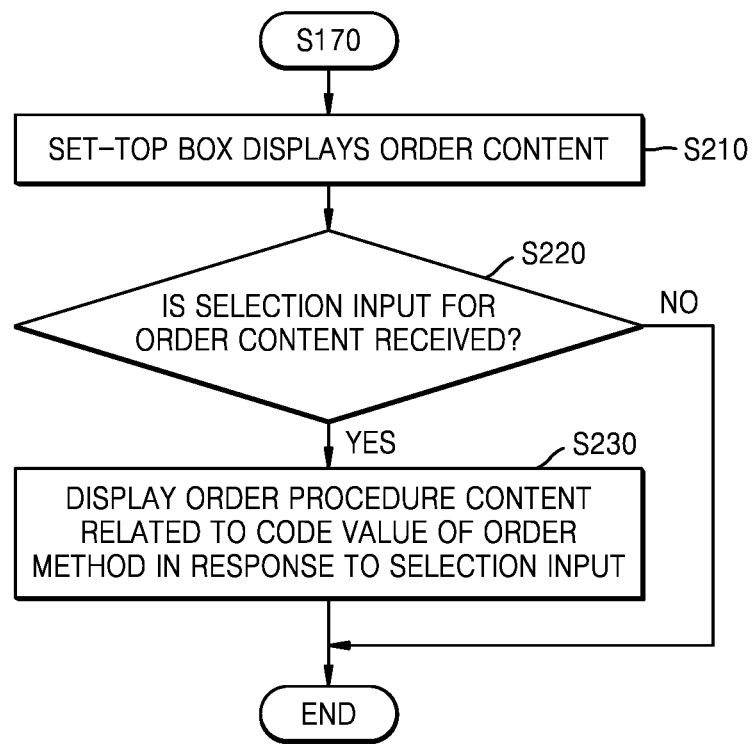
FIG. 4 is a flowchart of a method of processing an input for order content, according to embodiments.

FIG. 4 is a flowchart of a method of processing an input for order content, according to embodiments.

As illustrated in FIG. 4, in operation S210, the set-top box 300 may display order content corresponding to the call waiting content. Messages regarding the first order method and/or the second order method may be alternately output using the call waiting content, and while the first order method or the second order method are output, order procedure content regarding the first order method or the second order method may be generated and provided.

In operation S220, the set-top box 300 may receive an input of selecting the order content.

Order procedure content corresponding to a code value of the order method selected according to the input may be provided. For example, when a selection input regarding the 'remote-control order' is received, order procedure content regarding the 'remote-control order' may be provided. When a selection input regarding the 'easy automatic order' is received, order procedure content regarding the 'easy automatic order' may be provided.

In operation S230, the set-top box 300 may display order procedure content corresponding to a code value of an order method that is output to the call waiting content.

The order procedure content regarding the 'easy automatic order' may be order procedure content corresponding to a corresponding order method and may include a screen on which phone numbers corresponding to IDs of the set-top box are provided according to the 'easy automatic order.'

Also, a process of selecting a phone number, to which the corresponding order method is applied, from among the phone numbers may be performed using the order procedure content regarding the 'easy automatic order.'

The order procedure content regarding the 'remote-control order' may include order information according to an input from the remote control, a screen on which payment information is input, and a screen on which an order quantity is input.

Figure 5:
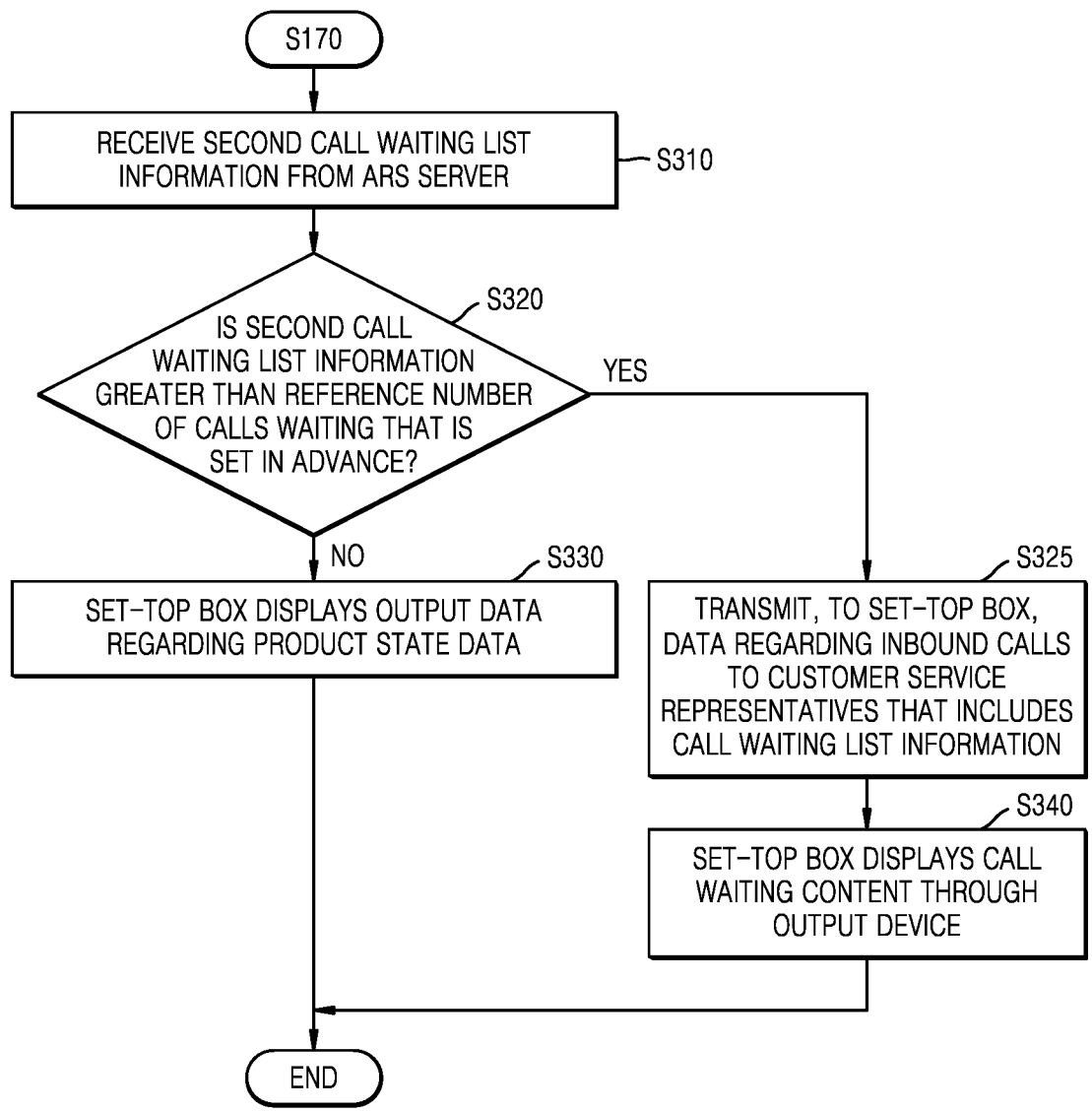
FIG. 5 is a flowchart of a method of displaying output data regarding product state data instead of the call waiting content, according to embodiments.

FIG. 5 is a flowchart of a method of displaying output data regarding product state data instead of the call waiting content, according to embodiments.

As illustrated in FIG. 5, in operation S310, the media providing server 100 may receive, from the ARS server 500 or the data server 600, second call waiting list information to which a current ARS order call corresponding to the image identification information is reflected.

In operation S320, the media providing server 100 may determine whether the second call waiting list information is greater than the predetermined reference number of waiting calls.

In operation S330, when the second call waiting list information is less than or equal to the reference number of waiting calls, the media providing server 100 may not transmit the data regarding the inbound calls to the customer service representatives to the set-top box 300, and the set-top box 300 may display the output regarding the product state data instead of the call waiting content.

In operation S325, when the second call waiting list information is less than or equal to the reference number of waiting people, the media providing server 100 may transmit, to the set-top box 300, the data regarding the inbound calls to the customer service representatives. In operation S340, the set-top box 300 may display the call waiting content, corresponding to the second call waiting list information.

Figure 6:
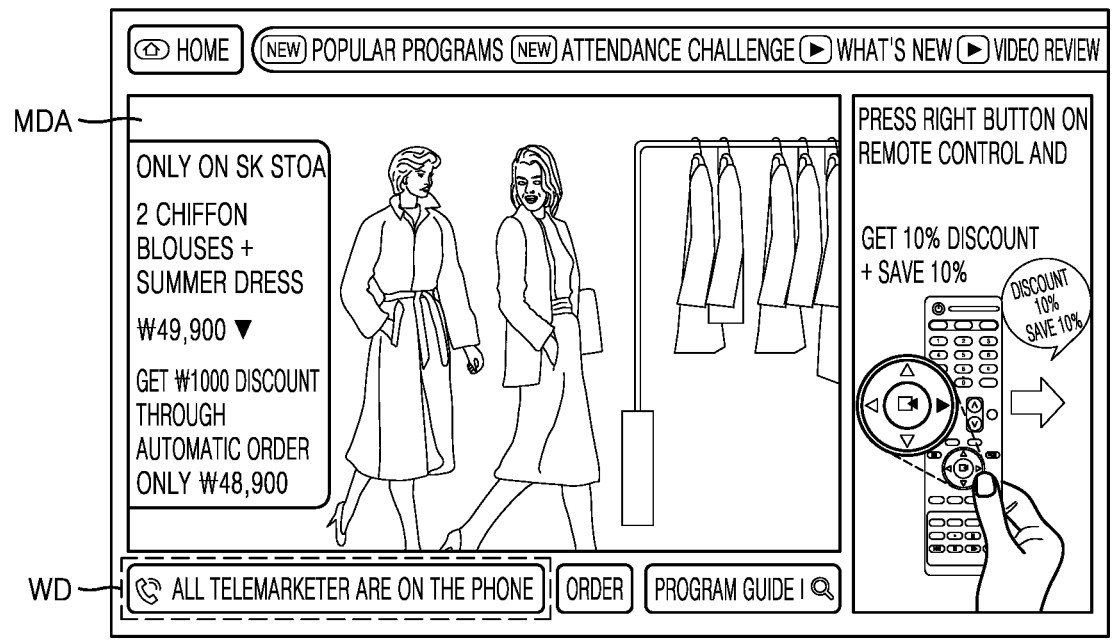
FIG. 6 shows an example of an output screen of the call waiting content, according to embodiments.

FIG. 6 shows an example of an output screen of call waiting content, according to the present embodiments.

According to the present embodiments, content WD displays the number of calls waiting and commerce content is displayed in an MDA area, according to the control of the set-top box 300. For example, the content WD displays "ALL TELEMARKETERS ARE ON THE PHONE," among other content. The content WD may display one of 'ALL TELEMARKETERS ARE BUSY', 'X CALLS WAITING', 'CALLS WAITING TIME IS ABOUT X MINUTES'.

The content WD regarding the number of calls waiting may be set to be displayed when the call waiting list information is greater than the predetermined reference number of waiting people. When the call waiting list information is less than or equal to the predetermined reference number of waiting calls, the media providing server 100 may control the product state data to be output using the content WD. The product state data may include at least one of information regarding a progress of broadcast content that is currently aired, information regarding the end of broadcast, information regarding reviews registered in real-time, comment information, and information regarding a current order status (the number of orders, the number of accumulated orders, the number of pre-orders, sale figures, etc.).

When the call waiting list information is greater than the certain reference number of waiting calls, the media providing server 100 may control various messages such as a message 'there is a queue of people' to be displayed on the output device 400 of the set-top box 300. The message includes a call waiting content.

Figure 7:
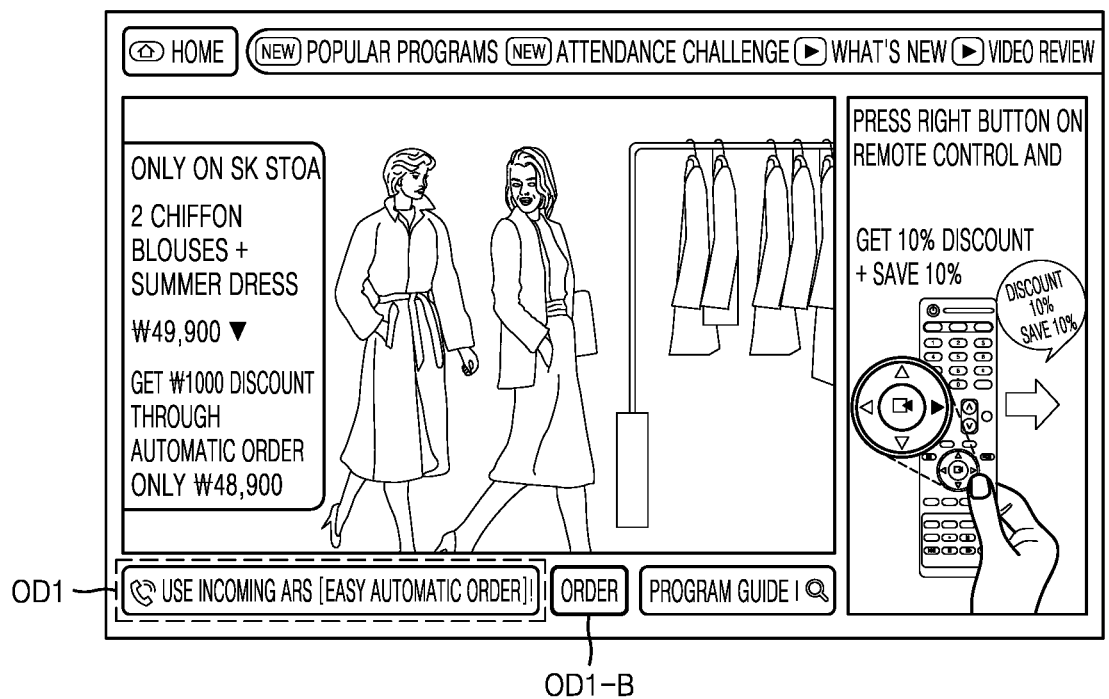
FIG. 7 shows an example of order content and the call waiting content, according to embodiments.

FIG. 7 shows an example of order content and call waiting content, according to the present embodiments.

When the call waiting list information is greater than the certain reference number of waiting people, the media providing server 100 may transmit the call waiting list information to the set-top box 300. The set-top box 300 may provide order content OD1 that may be ordered according to order methods registered in broadcast content.

The order content OD1 is broadcast content or content that may be ordered according to the 'easy automatic order' that is one of the order methods provided by the media providing server 100.

While the order content OD1 is displayed, an order procedure regarding the 'easy automatic order' may be performed in response to an input of selecting an order area OD1-B, as shown in FIG. 7.

The 'easy automatic order' is processed through an ARS order call and a separate on-demand ARS server, and according to the 'easy automatic order,' an order call may directly enter a terminal of a user registered to the set-top box 300.

Figure 8:
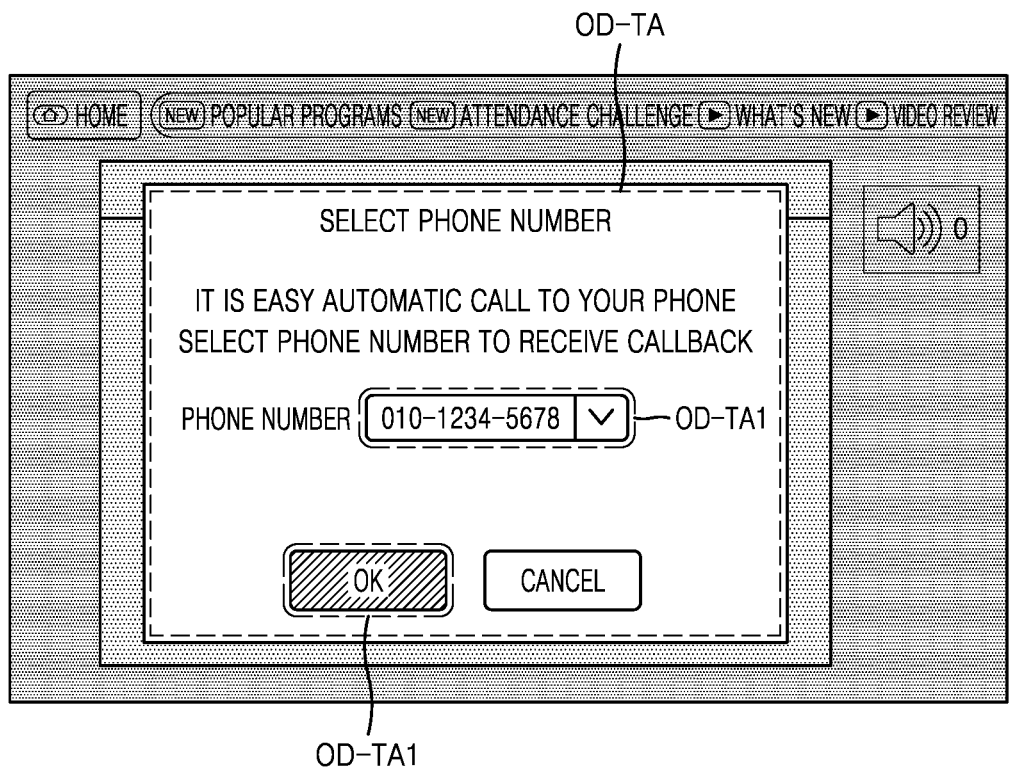
FIG. 8 shows an example of a screen on which a phone number is selected after a selection input for an order area is received.

FIG. 8 shows an example of a screen on which a phone number is selected after a selection input for the order area is received.

When the selection input for the order area is received, the media providing server 100 may send, to the data server 600, a request for phone number information registered based on an ID of the set-top box. The ID of the set-top box may be included in the selection input and received. When there are a plurality of phone numbers registered in the ID of the set-top box, the media providing server 100 may display a screen OD-TA of FIG. 8 on which one of the phone numbers is selected.

In an area of a confirmation input OD-TA1, there is a list of phone numbers, and after selecting a phone number, a user may receive a confirmation input OD-TA1.

Figure 9:
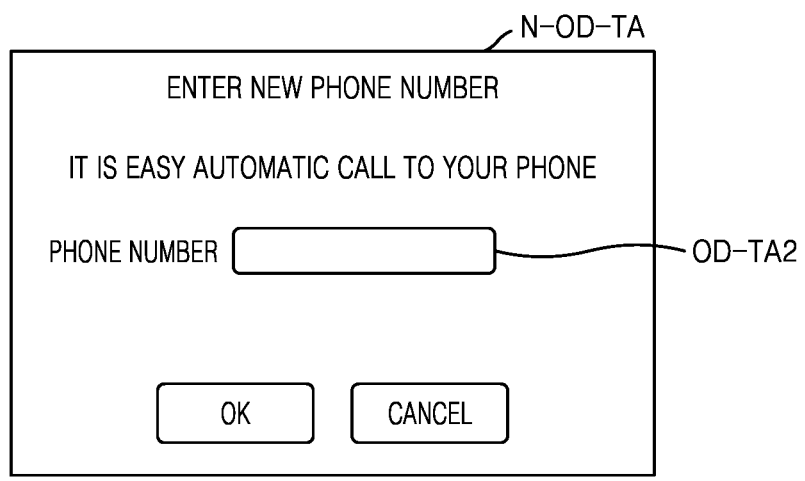
FIG. 9 shows an example of a screen on which a new phone number is input.

FIG. 9 shows an example of a screen on which a new phone number is input.

An order input of the easy automatic order is received, and when no phone number is registered to the ID of the set-top box, a screen N-OD-TA, on which a new phone number is input, may be provided.

A phone number may be input in a phone number input area OD-TA2.

Figure 10:
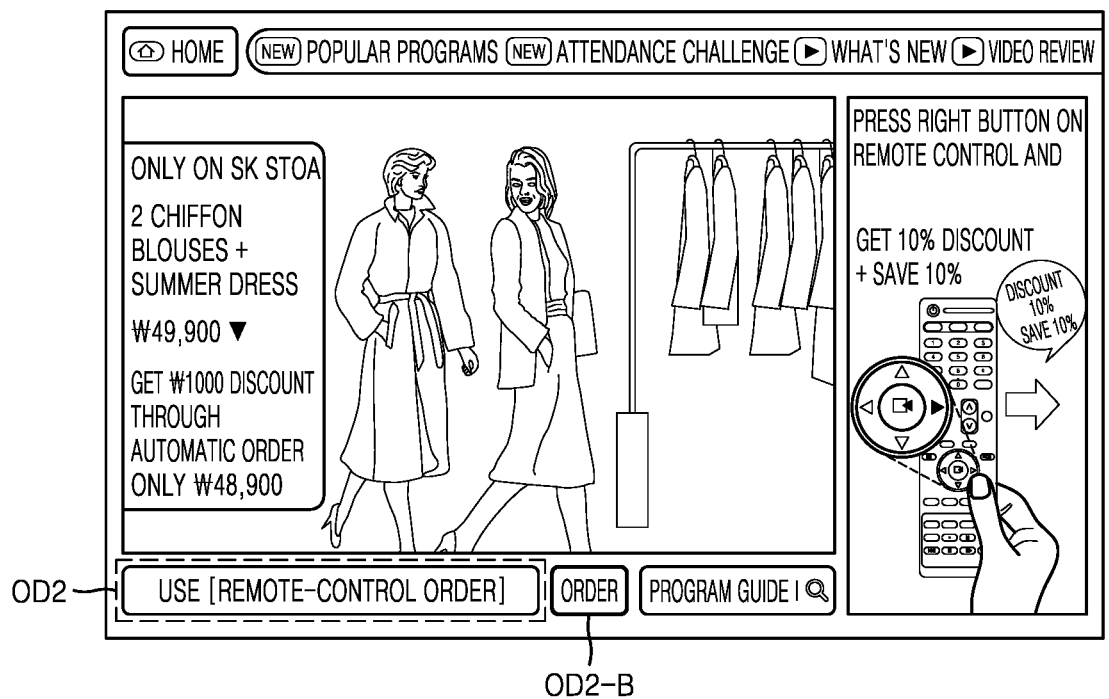
FIG. 10 shows another example of order content according to embodiments.

FIG. 10 shows another example of order content according to the present embodiments.

The order content OD2 may be content that may be ordered according to another order method registered in corresponding broadcast content. As illustrated in FIG. 10, the order content OD2 regarding the 'remote-control order' may be provided. In this case, the media providing server 100 may alternately display the order content OD2 regarding the 'remote-control order' and the order content OD1 regarding the 'easy automatic order.' When the order content OD2 regarding the 'remote-control order' is displayed, an order procedure using a remote control may be performed in response to an order input OD2-B.

FIG. 11 shows an example of an order procedure regarding the order input of the 'remote-control order.'

In response to an input for the remote-control order, an order information input screen OD2-TA1, which includes a product quantity/option selection area, a phone number input area, a date of birth input area (8 digits), and a personal data collection consent area, and a screen OD2-TA2 showing the payment amount including a discounted order amount may be provided.

The device described above may be realized as hardware components, software components, and/or a combination of hardware and software components. For example, the device and components described according to the embodiments may be realized using at least one general-use computer or special-purpose computer, for example, a processor, a controller, an Arithmetic Logic Unit (ALU), a digital signal processor, a microcomputer, an FPGA, a Programmable Logic Unit (PLU), a microprocessor, or any other device capable of executing instructions and sending responses. A processing device may execute an OS and at least one software application running thereon. Also, the processing device may access, store, manipulate, process, and generate data according to the execution of software. For convenience of understanding, it may be described that there is one processing device, but one of ordinary skill in the art would understand that a processing device may include a plurality of processing elements and/or multiple types of processing elements. For example, the processing device may include a plurality of processors or one processor and a controller. Also, the processing device may have another processing configuration such as a parallel processor.

Software may include a computer program, code, instructions, or at least one combination thereof and may configure a processing device to operate as desired or independently or collectively instruct the processing device. The software and/or data may be temporarily or permanently embodied in any type of machine, component, physical device, virtual equipment, computer storage medium or device, or transmitted signal waves to be interpreted by the processing device or provide instructions or data to the processing device. The software may be distributed over networked computer systems, and stored or executed in a distributed manner. Software and data may be stored in one or more computer-readable recording media.

The method according to the embodiments may be implemented as program instructions executable by a computer medium and may be recorded on a computer-readable recording medium. The computer-readable recording medium may include, alone or in combination, program instructions, data files, or data structures. The program instructions recorded on the computer-readable recording medium may be specially designed and configured for the embodiments or may be known and available to one of ordinary skill in the art of software, Examples of the computer-readable recording medium include hard disks, floppy disks, magnetic media such as magnetic tapes, optical media such as CD-ROMs or DVDs, magneto-optical media such as floptical disks, and hardware devices such as ROM, RAM, and flash memory which are specially designed to store and execute program instructions. Examples of the program instructions include machine-language code generated by a compiler as well as high-level language code executable by a computer by using an interpreter or the like. The hardware device may be configured to operate as at least one software module to perform the operations of the embodiments, and vice versa.

According to the media providing server and the method and computer program for providing call waiting content with respect to order calls when there are people waiting after making order calls for commerce content, the call waiting content is provided based on call waiting list information regarding ARS order calls for commerce content that is on air, and order content may be provided to place an order for a corresponding product according to order methods except for an ARS order method.

Although one or more embodiments have been described with reference to the attached drawings, it will be understood by one of ordinary skill in the art that various changes and modifications may be made therein from the above description. For example, appropriate results may be achieved even through the above-described techniques are performed differently from the described order, or the described systems, structures, devices, or components such as circuits are combined differently from the described methods or replaced or substituted with other components or equivalents.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A method of generating broadcast content responsive to a current usage load of a media providing system comprising:
    receiving, with a media providing server, a connection signal from a set-top box;
    transmitting, with the media providing server and to the set-top box, image identification information of commerce content in response to the connection signal;
    generating product state data regarding the image identification information and transmitting the product state data to the set-top box, wherein the generating and the transmitting are performed by the media providing server;
    generating call waiting content and transmitting, to the set-top box, output data about the call waiting content, wherein the generating and the transmitting are performed by the media providing server;
    receiving, with the media providing server and from an automatic response system (ARS) server, data regarding a current status of inbound calls to customer service representatives that includes first call waiting list information;
    determining whether the first call waiting list information is greater than a predetermined reference number of waiting calls;
    upon determination that the first call waiting list information is greater than the predetermined reference number of waiting calls, transmitting, with the media providing server and to the set-top box, the first call waiting list information via the ARS server;
    displaying, by the set-top box, the call waiting content corresponding to the first call waiting list information;
    displaying, by the set-top box, order content included in the call waiting content; and
    displaying, by the set-top box and upon receiving a selection input for the order content, order procedure content corresponding to a code value of the selection input,
    wherein generating the call waiting content further comprises generating order content of at least one order method with the media providing server, and wherein said at least one order method is different from an automatic response system call order method.

2. The method of claim 1, wherein generating the call waiting content further comprises generating:
    first output content for displaying the first call waiting list information;

second output content for displaying at least one order method, or both.

3. The method of claim 1, wherein generating the call waiting content further comprises:
generating first order content of an on-demand ARS order method, or generating second order content of a remote-control order method.

4. The method of claim 1, further comprising, upon determination that the first call waiting list information is not greater than the predetermined reference number of waiting calls, outputting, by the set-top box, output data regarding the product state data through an output device.

5. The method of claim 1, further comprising:
after the displaying of the call waiting content, receiving, from the ARS server, second call waiting list information; and
upon determination that the second call waiting list information is less than or equal to the predetermined reference number of waiting calls, displaying, by the set-top box, product state data regarding the image identification information.

6. The method of claim 1, further comprising:
receiving, with a data server, a product state data regarding the image identification information;
transmitting, to the data server, a product state data request signal comprising a product code corresponding to the image identification information; and
generating the product state data by using a response signal of the product state data request signal.

7. A non-transitory computer-readable recording medium storing therein an operating program that causes a computer to execute a process comprising:
receiving a connection signal from a set-top box;
transmitting, to the set-top box, image identification information of commerce content in response to the connection signal;
generating product state data regarding the image identification information and transmitting the product state data to the set-top box, wherein the generating and the transmitting are performed by a media providing server;
generating call waiting content and transmitting, to the set-top box, output data about the call waiting content, wherein the generating and the transmitting are performed by the media providing server;
receiving with the media providing server, from an automatic response system (ARS) server, data regarding a current status of inbound calls to customer service representatives that includes first call waiting list information;
determining whether the first call waiting list information is greater than a predetermined reference number of waiting calls;
upon determination that the first call waiting list information is greater than the predetermined reference number of waiting calls, transmitting, with the media providing server and to the set-top box, the first call waiting list information via the ARS server;
displaying the call waiting content corresponding to the first call waiting list information;
displaying order content included in the call waiting content; and
displaying, upon receiving a selection input for the order content, order procedure content corresponding to a code value of the selection input,
wherein generating the call waiting content further comprises generating order content of at least one order method with the media providing server, and wherein said at least one order method is different from an automatic response system call order method.

8. A media providing server comprising:
a communication unit and a processor,
wherein the processor is configured to:
receive a connection signal from a set-top box and transmit, to the set-top box, image identification information of commerce content in response to the connection signal;
generate product state data regarding the image identification information and transmit the product state data to the set-top box;
generate call waiting content and transmit, to the set-top box, output data about the call waiting content;
request, to an automatic response system (ARS) server, data regarding a current status of inbound calls to customer service representatives based on current time information and receive, from the ARS server, first call waiting list information; and
determine whether the first call waiting list information is greater than a predetermined reference number of waiting calls, and upon determination that the first call waiting list information is greater than the predetermined reference number of waiting calls, transmit, to the set-top box, the first call waiting list information through the ARS server and control the set-top box to display output data about the call waiting content,
wherein the set-top box is controlled to display order content included in the call waiting content,
wherein, when a selection input for the order content is received, the set-top box is controlled to display order procedure content corresponding to a code value of the selection input,
wherein the call waiting content comprises the order content of at least one order method which is different from an ARS call order method.

9. The media providing server of claim 8, wherein the call waiting content further comprises first output content for displaying the first call waiting list information, second output content for displaying at least one order method, or both.

10. The media providing server of claim 8, wherein the call waiting content further comprises first order content of an on-demand ARS order method and second order content of a remote-control order method.

11. The media providing server of claim 8, wherein, upon determination that the first call waiting list information is not greater than the predetermined reference number of waiting calls, the set-top box is controlled to display output data regarding the product state data through an output device.

12. The media providing server of claim 8, wherein the process is configured to:
receive, from the ARS server, second call waiting list information after the call waiting content is displayed; and
transmit the second call waiting list information to the set-top box when a determination as to whether the second call waiting list information is less than or equal to the predetermined reference number of waiting calls is made, and
the set-top box is configured to display the product state data regarding the image identification information, corresponding to the second call waiting list information.

13. The media providing server of claim 8, wherein the processor is further configured to receive the data regarding the inbound calls to the customer service representatives from the ARS server via a data server.

14. The media providing server of claim 8, wherein the processor is further configured to:
- receive the product state data regarding the image identification information from a data server, and
- transmit, to the data server, a product state data request signal comprising product code corresponding to the image identification information; and
- generate the product state data by using a response signal of the product state data request signal.

\* \* \* \* \*